UNITED STATES PATENT OFFICE.

MARION DORSET AND ROBERT R. HENLEY, OF WASHINGTON, DISTRICT OF COLUMBIA.

PROCESS FOR SEPARATING SERUM FROM THE CORPUSCLES OF MAMMALIAN-BLOOD.

1,264,285.      Specification of Letters Patent.      Patented Apr. 30, 1918.

No Drawing.      Application filed October 6, 1916. Serial No. 124,151.

(DEDICATED TO THE PUBLIC.)

*To all whom it may concern:*

Be it known that we, MARION DORSET and ROBERT R. HENLEY, citizens of the United States of America, and employees of the Department of Agriculture of the said United States, both residing in the city of Washington, in the District of Columbia, (whose post-office address is Washington, D. C.,) have jointly invented new and useful Improvements in Processes for Separating Serum from the Corpuscles of Mammalian-Blood.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to us of any royalty thereon.

Our invention relates to an improvement in the method of separating the serum or plasma from the corpuscles of defibrinated mammalian blood, in particular the blood of swine, horses, rabbits, and the production, by separation of serum from corpuscles, by heat and by filtration, of serum freed from all inert suspended matter, including corpuscles, filterable and non-filterable micro-organisms. Our process has particular application to the preparation of protective serums, including antibodies, from defibrinated blood and from blood which has been citrated or oxalated to prevent coagulation. The process is applicable to many different forms of antitoxin and to antibodies of various kinds. It seems unnecessary to refer to the various uses to which our process may be applied. Therefore, particular description will be made merely of the application of the process to the preparation of hog cholera antitoxin, as disclosed in Dorset Patent No. 823,110.

It is known that the protective principles and antibodies contained in the blood drawn from hogs which have been hyperimmunized as described in Dorset Patent No. 823,110 reside exclusively in the serum of such blood. In the past the serum has been separated from the blood by any one of several ways, namely:

A. The blood, after drawing, is allowed to clot spontaneously and the clear serum which separates is poured off or removed by other suitable means.

B. Shortly after drawing, the blood is defibrinated by whipping, shaking, or other mechanical means. The fibrin strained off and the red blood cells which are suspended in the defibrinated blood are removed by centrifugalization.

C. The blood is drawn directly into a suitable amount of a solution of an oxalate or citrate, or other chemical which will prevent coagulation. The whole blood is then subjected to centrifugalization and the plasma is separated from the red cells. The fibrin which is contained in the plasma is separated either by chemical means, thus causing a precipitation, or by heat, which produces the same effect. The serum freed of fibrin is then separated from the precipitate by filtration, or other suitable process.

The difficulties in these various processes consists in—

1. The fact that the yield of clear serum is comparatively small; or
2. The separation of the serum from the corpuscles is tedious and expensive; or
3. The separation of the serum and the red cells is incomplete, thus causing a loss in antibodies which remain in the serum which can not be readily separated from the blood corpuscles.

The advantages to be derived from our process consists, briefly, in the complete separation of red blood cells, the cheapness of the process, and the simplicity of the steps involved.

Our invention consists in the addition, to the whole hog's blood, or to the whole hog's blood which has been mixed with citrates or oxalates to prevent coagulation, or to the defibrinated hog's blood, of a substance which will cause the agglutination of the blood cells. It is well known that agglutinins may be produced in the animal economy by the injection of foreign blood corpuscles, and such agglutinins can be used, but, preferably, applicants use the agglutinins from vegetable sources. The vegetable agglutinins employed by us are obtained from the seed of various plants by extraction of the dried, ground seed with either hot or cold water, or with either hot or cold physiological salt solution, or with either hot or cold physiological salt solution containing a suitable antiseptic. After extraction the solid material is strained out, the fluid extract is filtered, first through paper or paper and kieselguhr, and then, if desired, through bacteria-proof filters. The agglutinin is then ready for use and may be immediately used, or if prepared with an antiseptic, or filtered, may be kept for future use. After agglutination of the blood corpuscles has taken place the serum which separates may be immediately removed, or, what is more satisfactory, the mixture of blood and agglutinin may be subjected to centrifugalization, thus causing a packing of the blood cells and, therefore, a more complete separation of serum from the corpuscles. As the corpuscles are packed together in a more or less firm mass, the removal of the serum by pouring or by other suitable means is facilitated.

As an extension of our process there is added to the mixture of blood and agglutinin, a small amount of a suitable neutral chemical salt, such as sodium chlorid or sodium citrate. The use of this chemical salt causes a contraction and a firmer packing of the red blood cells, thus resulting in a larger yield of clear serum than can possibly be secured by the use of the agglutinin alone or by mere centrifugalization without the use of an agglutinin. When the clear serum has been separated, it may be heated at temperatures sufficiently high to destroy the virus of certain diseases which may contaminate hog's blood, particularly the virus of foot-and-mouth disease, which cannot be removed from serum by filtration. The serum which has been separated by this process may also be passed through bacteria-proof filters for the purpose of removing any dead bacteria, or spores which may have survived the heating.

While the process is applicable to whole hog's blood, or to the whole blood which has been mixed with citrate or oxalate solution to prevent coagulation, as hereinbefore described, we have usually preferred to apply the process to the fresh hog cholera defibrinated blood antitoxin. For this reason the description of the process which follows is restricted to the application of the method to fresh hog cholera defibrinated blood antitoxin, though we wish it to be understood, as already indicated, that essentially the same method may be applied with equally as good results to other bloods in other forms.

In carrying out our invention we take a definite quantity of fresh hog cholera defibrinated blood antitoxin, and to this add known quantities of an agglutinin obtained by extracting the seed of suitable leguminous plants, as, for example, the white navy bean, or the kidney bean, or the scarlet runner bean, or the common peanut. The proportion of the extract to be added may be varied, if desired. This addition causes an agglutination of the corpuscles of the blood whereby they are caused to collect together in a semi-solid mass, and they may then be readily separated by a variety of mechanical means, as for example, centrifugalization in the ordinary bucket type of centrifuge or in the rotary centrifuge such as is used commonly for separating cream from milk. Even without the use of the centrifuge the serum may be readily removed from the red cells, provided a sufficient amount of the agglutinin is employed in the first place and sufficient time is allowed to elapse so that the corpuscles may settle out from the serum. Centrifugalization, in the bucket type of centrifuge, results in the forming of a solid liver-like mass of corpuscles in the bottom of the cup, from which a clear serum may be poured with no danger of contamination with suspended corpuscles or other particulate matter which may be present in the defibrinated blood.

Other types of centrifuge, such as the rotary centrifuge, may be used, but we have preferred the bucket type of centrifuge.

As an extension of this process, to the blood to which the agglutinin has been added, as disclosed, a small amount, for example, 1 per cent. of sodium chlorid or a suitable amount of other neutral salt, such as sodium citrate is added either in dry form or in solution, and the blood-agglutinin-salt-mixture is then allowed to stand, or is centrifuged to facilitate the separation of cells and serum essentially as described above. The addition of the salt increases the yield of clear serum materially over the amount obtainable by other known methods and the loss of antitoxin is correspondingly reduced.

The clear serum separated in this way may be mixed with a suitable antiseptic and is then ready for use in treating hogs for hog cholera; or, either before or after the addition of the chemical preservative, for example, one-half per cent. phenol, the serum may be heated to a temperature sufficient to destroy the virus of common diseases affecting animals. It has been found that a temperature of 59 to 60° C. maintained for a period of 30 minutes does not injure the antitoxic potency of the serum, although such heating is effectual in destroying the viruses in question. If desired, the heat may be applied at a lower temperature for a longer period in order to accomplish the same result. The serum is now in condition to be used in practice, provided that if the heating is done before the addition of a preservative, the preservative should be added after the serum has been heated and cooled. Although the process of heating will serve to destroy all vegetative forms of bacteria, the purification may be carried a step further if desired, by subjecting the heated serum to filtration through bacteria-proof filters in order to remove all dead bacteria or any micro-organisms which may have accidentally contaminated the serum during handling. In case filtration is resorted to, this may take place either before or after the addition of a suitable chemical preservative and the serum is then in a condition for use for the immunization of hogs against hog cholera.

Having described our process, we claim:

1. In the art of separating the blood serum from the blood corpuscles of mammalian blood, the step comprising the addition to mammalian blood of a soluble chemical salt, preferably sodium chlorid, and a vegetable agglutinin.

2. In the art of producing a clear serum, free from the corpuscles of mammalian blood, the step comprising the addition to such blood of a vegetable agglutinin and thereupon permitting the separation of the serum from the agglutinated corpuscles.

3. In the art of producing a clear serum free from the corpuscles of mammalian blood, the step comprising the addition to such blood of a vegetable agglutinin and a soluble salt, preferably sodium chlorid, and thereupon permitting the separation of the serum from the agglutinated corpuscles.

4. In the art of producing a clear serum free from the corpuscles of mammalian blood, the step comprising the addition to such blood of a vegetable agglutinin and sodium chlorid and thereupon permitting the separation of the serum from the agglutinated corpuscles.

5. A clear serum separated from mammalian blood by the action upon such blood of vegetable agglutinins.

6. A clear serum separated from mammalian blood by the action upon such blood of a vegetable agglutinin and a soluble chemical salt, preferably sodium chlorid.

7. A clear serum separated from mammalian blood by the action upon such blood of a vegetable agglutinin and sodium chlorid.

In testimony whereof, we affix our signatures in the presence of two subscribing witnesses.

MARION DORSET.
ROBERT R. HENLEY.

Witnesses:
W. S. STAMPER,
RALPH H. LEWIS.